(12) United States Patent
Bradford

(10) Patent No.: US 6,498,580 B1
(45) Date of Patent: Dec. 24, 2002

(54) MISSILE LAUNCH POINT ESTIMATION SYSTEM

(75) Inventor: Bert L. Bradford, Damascus, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 08/917,704

(22) Filed: Aug. 26, 1997

(51) Int. Cl.[7] .............................................. G01S 13/72
(52) U.S. Cl. ............................. 342/90; 342/62; 342/96; 342/97; 342/99; 342/107; 342/115; 342/140
(58) Field of Search ............................. 342/62, 90, 95, 342/96, 97, 98, 99, 107, 115, 139, 140

(56) References Cited

U.S. PATENT DOCUMENTS

| | | | |
|---|---|---|---|
| 3,063,047 A | 11/1962 | Steele | 342/107 |
| 3,270,340 A | 8/1966 | Hammack | 342/103 |
| 3,706,096 A | 12/1972 | Hammack | 342/107 |
| 3,795,911 A | 3/1974 | Hammack | 342/106 |
| 3,876,169 A * | 4/1975 | Fitzgerald et al. | 244/3.14 |
| 4,179,696 A | 12/1979 | Quesinberry | 342/75 |
| 4,179,697 A | 12/1979 | Golinsky | 342/458 |
| 4,527,161 A | 7/1985 | Wehner | 342/152 |
| 5,051,751 A | 9/1991 | Gray | 342/107 |
| 5,059,966 A | 10/1991 | Fujisaka | 342/25 |
| 5,252,980 A | 10/1993 | Gray | 342/59 |
| 5,313,212 A | 5/1994 | Ruzicks | 342/101 |
| 5,381,156 A | 1/1995 | Bock | 342/126 |
| 5,912,640 A * | 6/1999 | Bradford et al. | 342/99 |
| 5,959,574 A * | 9/1999 | Poore, Jr. | 342/96 |
| 6,114,984 A * | 9/2000 | McNiff | 342/62 |

* cited by examiner

Primary Examiner—John B. Sotomayor
(74) Attorney, Agent, or Firm—Richard L. Aitken; Venable

(57) ABSTRACT

In a system for estimating the launch point of a missile, Doppler shifted signals reflected from the missile as it travels from its launch point are used in a Kalman filter to estimate the missile position, velocity and acceleration, in earth centered fixed coordinates. The coordinate system is rotated to a rotated earth fixed (REF) coordinate system in which the X-axis passes through the estimated missile launch point and the Z-axis is made parallel to the missile azimuth as represented by the missile velocity determined by the Kalman filter. The error in the downrange component of the missile launch point is then reduced to a minimum in the REF coordinate system using a square root information filter. The coordinate system is then rotated to a second rotated earth fixed coordinate system in which the X-axis passes through the updated launch point position and the Z-axis is positioned at 45 degrees from the missile azimuth. The Z-axis component and the Y-axis component of the error in the launch point is then reduced to a minimum in the new REF coordinate system using a square root information filter.

10 Claims, 2 Drawing Sheets

MISSILE LAUNCH POINT ESTIMATION SYSTEM

BACKGROUND OF THE INVENTION

This invention is directed to a system for estimating the launch point of a missile from Doppler data. The launch point of the missile can be estimated from Doppler by standard differential correction techniques. However, these techniques do not give an accurate estimate of the launch point because of a lack of sensitivity of the techniques to cross range error. More specifically, the launch point error can be decomposed into a downrange error which is the error parallel to the azimuth of the missile velocity and a cross range error which is error perpendicular to the missile velocity. With Doppler measurements alone, standard differential correction techniques result in small downrange error, but achieve very little reduction in the cross range error relative to the initial estimate of the launch position. As a result, the accuracy of the launch point is adversely constrained by the cross range error in the initial estimate of the launch point.

SUMMARY OF THE INVENTION

In earth centered fixed coordinates (ECF), the launch point is estimated by its latitude and longitude and is equivalent to a two-dimensional problem. In accordance with the invention, the cross range error in the estimation is reduced by decoupling this two-dimensional problem into two one-dimensional problems. This decoupling is carried out by changing the coordinate system from ECF to rotated earth fixed coordinates (REF). The ECF coordinate system is a Cartesian coordinate system having its center of origin at the center of the earth and having a Z-axis extending between the poles of the earth. An X-axis extends from the origin to the intersection of the equator and the prime meridian and a Y-axis extends perpendicular to the X-axis in the plane of the equator. To convert this system in accordance with the invention to REF, which is also a Cartesian coordinate system having its origin at the earth's center, the X-axis is rotated to extend from the origin or earth's center to the estimated launch point and the Z-axis is rotated to be parallel to the azimuth of the missile velocity. The Y-axis will then be parallel to the cross range movement of the missile. In this REF coordinate system, the measurements are angular measurements like latitude and longitude. Position estimates along the Z-axis, called downrange estimates, are equivalent to latitude measurements and position estimates along on the Y-axis, called cross range estimates, are equivalent to longitude estimates. In accordance with the invention, the cross range estimate is held fixed and the error in the downrange component of the launch point estimate is reduced to a minimum using differential correction techniques. The solving of this problem is essentially a one-dimensional problem and decoupling of the problem from the cross range component of the launch point estimate is possible because the Doppler measurements predicted from the estimated missile trajectory have very little sensitivity to the cross range component of the launch point error. Thus, the process provides an accurate estimate of the downrange component of the launch point, but the cross range component still needs to be determined. In order to reduce the cross range error in the launch point estimate, a coordinate system must be selected, the axes of which are not parallel to the azimuth of the missile velocity. In the second phase of the process, to obtain an accurate estimate of the cross range component of the launch point, the coordinates are rotated to a second REF coordinate system in which the X-axis is again positioned to extend from the earth's center to the updated estimated launch point and the Z-axis is rotated 45 degrees with respect to the missile velocity azimuth. In this coordinate system changes in the Z component of the launch point position correspond to changes in both the downrange and cross range components of the launch point. Similarly, changes in the Y component in this coordinate system corresponds to changes in both the downrange and the cross range components of the launch point. In the second stage of the algorithm, the current estimate of either the Y component or the Z component, corresponding to longitude or latitude in REF coordinates, is held constant and the launch point is searched for within a narrow band which is rotated 45 degrees with respect to the initial direction of missile motion again using differential correction techniques. This second stage of computation is again essentially a one-dimensional problem. The second stage can be iterated to the extent necessary to achieve a desired accuracy by searching for the launch point along axes which are rotated at a variety of angles with respect to the missile azimuth.

In order to carry out the above-described method, the knowledge of the missile's velocity azimuth is required. The Doppler measurements provide accurate data from which the missile velocity can be estimated using a Kalman filter. The azimuth of the missile velocity is computed from the velocity vector prior to the first stage cutoff.

DESCRIPTION OF A PREFERRED EMBODIMENT

Figure 1:
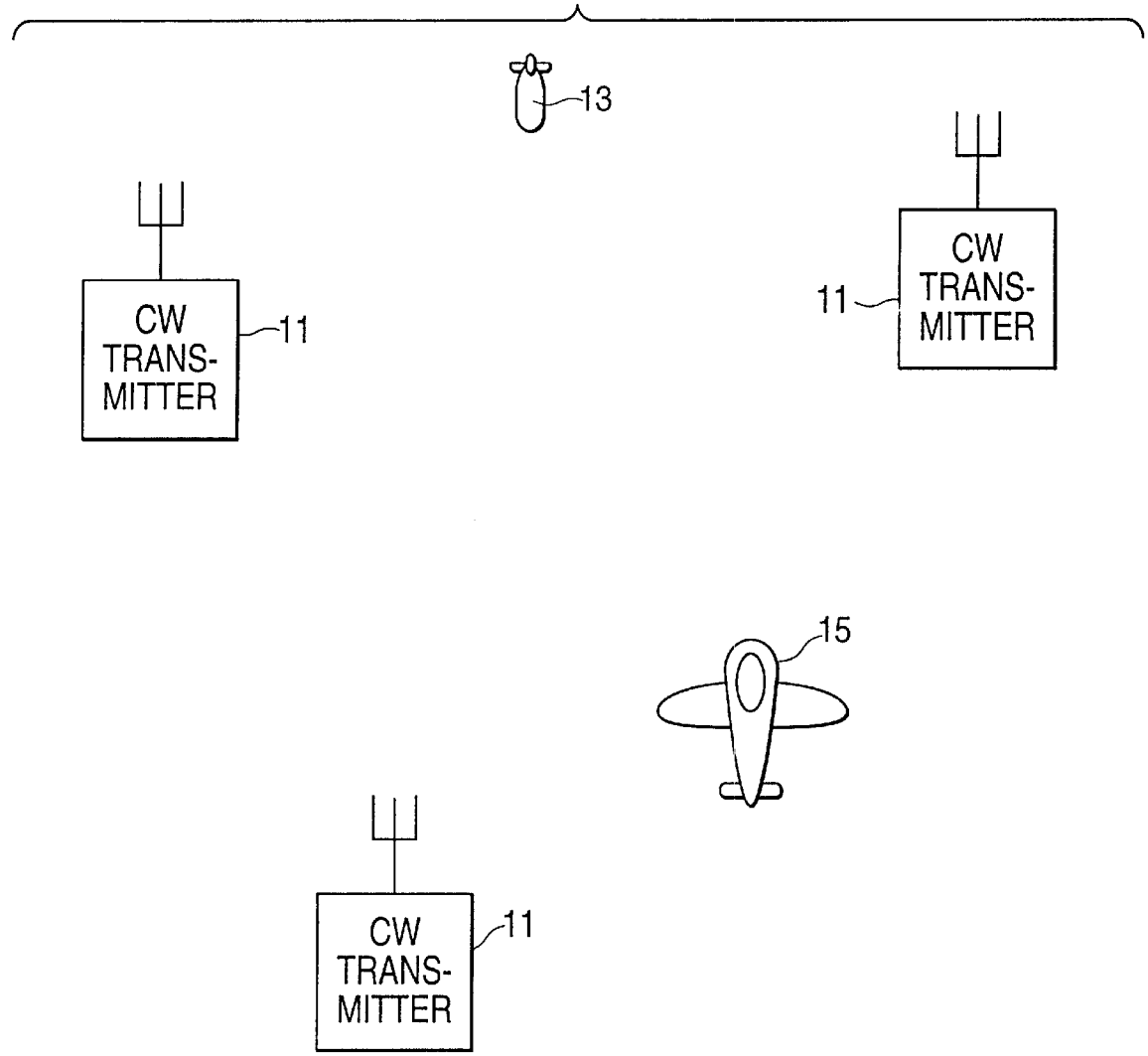
FIG. 1 is a diagram illustrating the operation of the system of the invention.

In the system of the invention, as shown in FIG. 1, continuous wave (CW) transmitters 11 transmit CW radar signals to be reflected from a missile 13 as it is launched from its launch point. The CW signals are detected by a receiver mounted on a movable platform 15 such as an aircraft.

Figure 2:
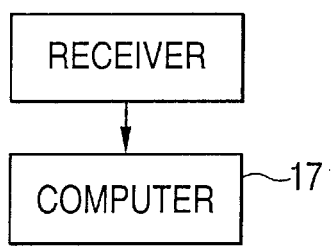
FIG. 2 is a block diagram illustrating a portion of the system of the invention.

As shown in FIG. 2, the signals received at the antenna are applied to a computer 17 in which the Doppler signals are processed in accordance with the present invention to provide an estimate of the launch point of the missile and its subsequent trajectory.

Figure 3:
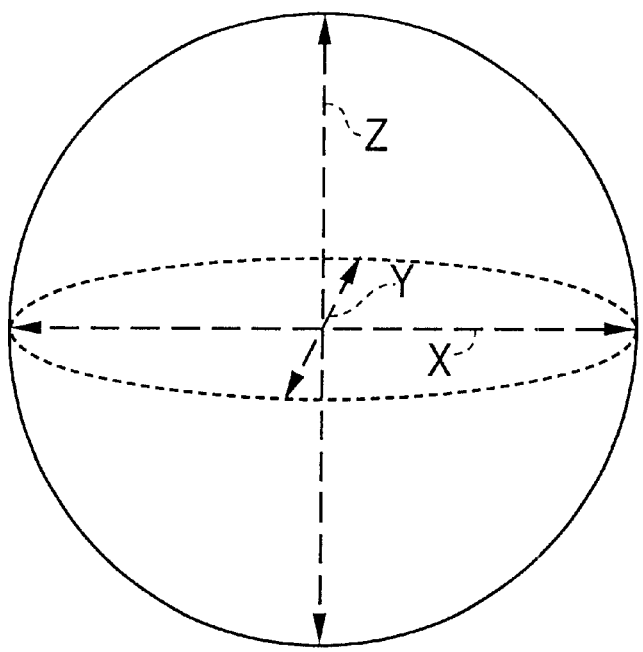
FIG. 3 is a diagram illustrating the ECF coordinate system.

The latitude and longitude of a point on the earth's surface may be considered in terms of a Cartesian coordinate system called the earth centered fixed coordinate system (ECF) in which the Z-axis extends between the earth's poles and the X and Y-axes lie in the equatorial plane with the X-axis passing through the prime meridian as illustrated in FIG. 3.

Figure 4:
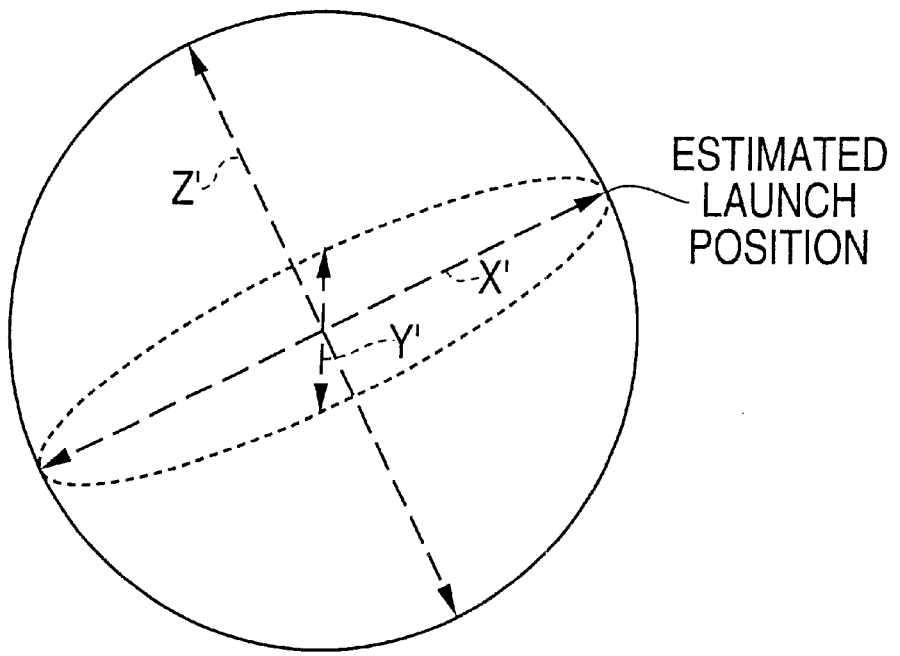
FIG. 4 is a diagram illustrating the REF coordinate system employed in the invention.

The system and method of the present invention systematically reduces the error in the initial estimation of the launch point to provide an accurate estimation of the launch point. In the first stage of the method of the invention, a new coordinate system called a rotated earth fixed coordinate system (REF) is employed as shown in FIG. 4. In this coordinate system, the X-axis is rotated to extend through the initial estimated launch point and the Z-axis is rotated to be parallel to the azimuth of the missile. When the missile is launched, it will travel in a vertical plane which extended intersects the origin of the X, Y and Z-axes at the center of the earth and the rotated X and Z-axes in the REF coordinates will lie in this vertical plane. The remaining Y-axis will then be perpendicular to this vertical plane in which the missile is traveling. The Z-axis will then be parallel to the azimuth of the missile and changes in position along the Z-axis are parallel to the downrange direction of the missile. The Y-axis is perpendicular to the vertical plane in which the missile travels and changes in position parallel to the Y-axis correspond to changes in the cross range direction relative to the direction of the missile travel.

The lack of sensitivity of the Doppler measurement to cross range error in the launch point compared to downrange error can be shown by considering the problem in the REF coordinate system. The frequency measurements received on the aircraft 15 depend upon the position of the transmitter, the position and velocity of the missile, and the position and velocity of the receiver mounted on the aircraft 15. The transmitters, also called illuminators, are considered to be in a fixed position.

The following vector quantities are denoted as follows:

I=illuminator position
T=missile position
R=receiver position
$\dot{T}$=missile velocity
$\dot{R}$=receiver velocity
u=I−T, û=u/|u|
v=R−T, v̂=v/|v|

The Doppler measurement is then given by:

$$f_d = (-1/\lambda)\frac{d}{dt}(|u| + |v|) \qquad (3)$$
$$= (1/\lambda)(\dot{T}\cdot\hat{u} + \dot{T}\cdot\hat{v} - \dot{R}\cdot\hat{v})$$

The cross range component of the target velocity is significantly smaller than the downrange component. Thus, in REF coordinates:

$|\dot{T}_y|<<|\dot{T}_z|$

The receiving antenna array is airborne and mounted on the aircraft 15 in such a way that it is side-looking. Because of limitations of the field of view, the mission is planned so that the cross range component of the aircraft velocity is significantly smaller than the downrange component. Thus, in REF coordinates:

$|\dot{R}_y|<<|\dot{R}_z|$

To simplify the analysis to follow, the extreme case is considered. For this case:

$\dot{T}_y\approx 0$ $\dot{R}_y\approx 0$

In this case, the Doppler equation reduces to:

$f_d\approx(1/\lambda)(\dot{T}_x u_x/|u|+\dot{T}_z u_z/|u|+\dot{T}_x v_x/|v|+\dot{T}_z v_z/|v|-\dot{R}_x v_x/|v|-\dot{R}_z v_z/|v|)$ How the downrange and crossrange components of the target position affect Doppler can now be analyzed. The downrange component of the target position enters the Doppler equation via $u_z$, $v_z$, $|u|$, and $|v|$. Furthermore, $u_z$ and $v_z$ are scaled by $\dot{T}_z$ and $\dot{R}_z$. On the other had, the crossrange component of the target position enters the Doppler equation only through |u| and |v|. The result of this is that Doppler is less sensitive to the crossrange error in target position than it is to the downrange error. Consequently, it is significantly more difficult to estimate the crossrange component of the launch point than the downrange component.

Three numerical examples are presented which are all based on a launch of a Storm missile at White Sands Missile Range (WSMR) on Aug. 16, 1995. The source of the Storm data is the ground radar at WSMR, while the source of the aircraft data is Global Positioning System (GPS). All the data is in REF coordinates, while the units are kilometers, seconds and hertz. Example 1 is for an illuminator in Albuquerque, N. Mex. which is located downrange from the launch point. Example 2 is for an illuminator in Silver City, N. Mex. which is located predominantly crossrange from the launch point. Example 3 is the same as Example 1 except that the velocity components $\dot{T}_y$ and $\dot{R}_y$ have been set to zero.

NUMERICAL EXAMPLE 1

Illuminator: Highband in Albuquerque, N. Mex.
Time: 25.0
λ=0.00141907
u=(−1.6842, −11.2786,309.563)
v=(−3.47297, −85.1281, 19.9473)
$\dot{T}$=(0.507375, 0.00117622, 0.0466886)
$\dot{R}$=(−0.00142658, −0.0553296, 0.215284)
The Doppler corresponding to this data is:

$f_{d0}$=−60.7035

The Doppler corresponding to a perturbation of the target position by 100 KM in the downrange direction is:

$f_{d1}$=+54.5903

The Doppler corresponding to a perturbation of the target position by 100 KM in the crossrange direction is:

$f_{d2}$=−41.0247

NUMERICAL EXAMPLE 2

Illuminator: Highband in Silver City, N. Mex.
Time: 25.0
λ=0.00155124
u=(−7.6431, −179.348, 50.6324)
v=(−3.47297, −85.1281, 19.9473)
$\dot{T}$=(0.503375, 0.00117622, 0.0466886)
$\dot{R}$=(−0.00142658, −0.0553296, 0.215284)
The Doppler corresponding to this data is:

$f_{d0}$=−79.1935

The Doppler corresponding to a perturbation of the target position by 100 KM in the downrange direction is:

$f_{d1}$=+16.0149

The Doppler corresponding to a perturbation of the target position by 100 KM in the crossrange direction is:

$f_{d2}$=−58.1505

NUMERICAL EXAMPLE 3

Illuminator: Highband in Albuquerque, N. Mex.
Time: 25.0

$\lambda = 0.00141907$ u=(−11.6842, −11.2786, 309.563)

v=(−3.47297, −85.1281, 19.9473)

$\dot{T}$=(0.507375, 0.00, 0.0466886)

$\dot{R}$=(−0.00142658, 0.0, 0.215284)

The Doppler corresponding to this data is:

$f_{d0} = -21.9349$

The Doppler corresponding to a perturbation of the target position by 100 KM in the downrange direction is:

$f_{d1} = +83.6296$

The Doppler corresponding to a perturbation of the target position by 100 KM in the crossrange direction is:

$f_{d2} = -1.16157$

The above examples show that the Doppler measurements are much more sensitive to downrange perturbation than crossrange perturbation. In the method of the invention as described above, the latitude and longitude of the initial estimate of the launch point are transformed to represent the initial estimate of the launch point in the REF coordinate system. This transformation is carried out in accordance with the following equation:

$$\text{ECF2REF} = \text{Rot}_x(az) \cdot \text{Rot}_y(-lat) \cdot \text{Rot}_z(lon)$$

in which az is the missile velocity azimuth, lat is the estimated latitude of the missile launch point and lon is the estimated longitude of the missile launch point. As a result of this transformation, the initial estimate of the launch point will be expressed in latitude and longitude in the REF coordinates. As in the ECF coordinate system, changes in latitude will be parallel to the Z-axis and changes in longitude will be parallel to the Y-axis. In accordance with the present invention, the REF longitude is held fixed and using differential correction employing the received Doppler signals, the error in the REF latitude is reduced to a minimum. At this point, the REF latitude of the launch point will be determined with substantial accuracy.

In the second stage of the method, a new set of REF coordinates are established which shall be called REF2. In this new set of REF2 coordinates, the X-axis is again arranged to pass through the updated estimate of the launch point, but the Z-axis is rotated to be displaced at an angle between 0 and 90° from the missile azimuth. The angle of the Z-axis is preferably 45° from the missile azimuth. The transformation to the REF2 coordinate with 45° displacement from the missile azimuth is in accordance with Equation (2) below.

$$\text{ECF2REF} = \text{Rot}_x(az + \pi/4) \cdot \text{Rot}_y(-lat) \cdot \text{Rot}_z(lon) \qquad (2)$$

Following the transformation to the REF2 coordinate system, either the Y-axis or the Z-axis is selected and the error in the component of the estimate of the launch point along the selected axis is reduced to a minimum by differential correction, again making use of the Doppler measurements prior to the first stage cutoff. This second stage reduces both the crossrange error component as well as the downrange error component and thus provides a relatively accurate estimate of the location of the launch point in both dimensions. The second stage of the process may then be iterated with REF Z-axes at different angles to the missile azimuth to improve the estimate of the crossrange component of the launch point.

The present invention uses a Kalman filter combined with a square root information filter (SRIF) to estimate the missile azimuth and to reduce the launch point estimate errors to a minimum. The Kalman filter performs its calculations by starting from an initial state vector, extrapolating it, and then making corrections to it using the Doppler measurements. The state vector comprises the position, velocity, and acceleration of the missile. The initial values of the state vector provided to the Kalman filter are obtained from an estimate of the launch parameters provided by the SRIEF in accordance with the WGS84 ellipsoid model. The Kalman filter estimates position, velocity, and acceleration as the missile travels from the launch point to the first stage cutoff and provides this information to the SRIF. The SRIF estimates the launch point parameters including the latitude and if longitude from the Doppler residuals provided by the Kalman filter. The updated launch point is returned to the Kalman filter and this process cycles through several iterations until the launch point estimation error is reduced to a minimum. The Kalman filter performs its calculations in ECF coordinates and the SRIF performs its calculations in REF coordinates. In order to rotate the axes of the ECF coordinates to the REF coordinates, knowledge of the missile azimuth is required since the Z-axis in the REF coordinates is to be aligned with the missile azimuth. Each time the Kalman filter provides data to the SRIF, the SRIF adjusts the REF coordinates to correspond to the azimuth of the missile as indicated in the latest estimate of the missile velocity. The initial values of the launch parameters provided at the start of the process are a priori values.

The details of the Kalman filter and the SRIF are described in more detail below. The computer listing in Appendix A is the source code listing of the process in Mathematica.

The Kalman filter utilizes a nine element state vector (position, velocity, acceleration in ECF coordinates) and a constant acceleration motion model. Note that the acceleration components represent thrust only, while the earth's gravity and other terms will be included in the dynamics model. The state vector will be denoted by:

$$X = [px, py, pz, vx, vy, vz, ax, ay, az]^T$$

in which px, py and pz are the components of the missile position in ECF, vx, vy and vz are the missile velocity components in ECF and ax, ay and az are the missile acceleration components in ECF.

For brevity, the state vector is sometimes denoted by:

$$X = [P, V, A]^T$$

where:

$$P = [px, py, pz]^T, \text{ etc} \ldots$$

The extrapolated state vector is given by:

$$\tilde{P} = P + \Delta t V + \tfrac{1}{2} \Delta t^2 (A - \mu P / |P|^3 - 2\omega \times V) + w_P$$

$$\tilde{V} = V + \Delta t (A - \mu P / |P|^3 - 2\omega \times V) + w_V$$

$$\tilde{A} = A + w_A$$

in which $\Delta t$ is the time interval between measurements, and $\mu$ is the earth's gravitational constant.

The process noise $w=[w_p, w_V, w_A]^T$ is assumed to be Gaussian and zero mean. In order to extrapolate the covariance matrix, the above dynamics model must be linearized. For this purpose, the following notation is introduced:

$$G = \frac{d}{dP}[\mu P/|P|^3]$$
$$= \mu|P|^{-6}[|P|^3 I - 3|P|PP^T]$$
$$= \mu|P|^{-5}[|P|^2 I - 3PP^T]$$

in which I is the identity matrix.

The extrapolated covariance matrix is given by:

$$\tilde{P}_x = \phi P_x \phi^T + Q$$

where $\phi$ is the Jacobian of the dynamics model above (the state transition matrix in the linear case):

$$\phi = \begin{bmatrix} I - \frac{1}{2}\Delta t^2 G & \Delta t I & \frac{1}{2}\Delta t^2 I \\ -\Delta t G & I & \Delta t I \\ 0 & 0 & I \end{bmatrix}$$

and Q is the process noise covariance matrix:

$$Q = E[ww^T] = 0$$

To facilitate the implementation of the extrapolated covariance, $P_x$ is expressed in block matrix form as follows:

$$P_x = \begin{bmatrix} P_{00} & P_{03} & P_{06} \\ P_{30} & P_{33} & P_{36} \\ P_{60} & P_{63} & P_{66} \end{bmatrix}$$

The product $\phi P_x \phi^T$ can now be computed symbolically in this block matrix form, and the result simplified by using the symmetry of $P_x$:

$$P_{03} = P_{30}, \text{ etc} \ldots$$

The Doppler measurement is a function of the position and velocity of the illuminator, target (the missile) and receiver. The illuminator is stationary. These vector quantities are denoted as follows:

I=illuminator position (ECF)=position of a CW transmitter 11

T=target position (ECF)=position of missile 13

R=receiver position (ECF)=position of receiver platform 15

$\dot{T}$=target velocity (ECF)

$\dot{R}$=receiver velocity (ECF)

$u = I-T$, $\hat{u} = u/|u|$ $v = R-T$, $\hat{v} = v/|v|$

The Doppler frequency measurement is then given by:

$$f_d = (-1/\lambda)\frac{d}{dt}(|u| + |v|)$$
$$= (1/\lambda)(\dot{T}\cdot\hat{u} + \dot{T}\cdot\hat{v} - \dot{R}\cdot\hat{v})$$

In order to linearize the above measurement equation, the following partial derivatives are computed:

$$\partial \hat{u}/\partial x = -e_1/|u| + u(-1/2)|u|^{-3}(-2u_x)$$
$$= -e_1/|u| + (u_x/|u|^3)u$$
$$= ((u_x/|u|^2)u - e_1)/|u|$$

Similarly, partial derivatives for the other variables in the measurement equation From these equations, the following partials are determined:

$\partial f_d/\partial x = (1/\lambda)(((u_x/|u|^2)(\dot{T}\cdot u) - \dot{T}_x)/|u| + ((v_x/|v|^2)(\dot{T}\cdot v) - \dot{T}_x)/|v| - ((v_x/|v|^2)(\dot{R}\cdot v) - \dot{R}_x)/|v|)$ $\partial f_d/\partial y = (1/\lambda)(((u_y/|u|^2)(\dot{T}\cdot u) - \dot{T}_y)/|u| + ((v_y/|v|^2)(\dot{T}\cdot v) - \dot{T}_y)/|v| - ((v_y/|v|^2)(\dot{R}\cdot v) - \dot{R}_y)/|v|)$ $\partial f_d/\partial z = (1/\lambda)(((u_z/|u|^2)(\dot{T}\cdot u) - \dot{T}_z)/|u| + ((v_z/|v|^2)(\dot{T}\cdot v) - \dot{T}_z)/|v| - ((v_z/|v|^2)(\dot{R}\cdot v) - \dot{R}_z)/|v|)$ $\partial f_d/\partial \dot{x} = (1/\lambda)(\hat{u}_x + \hat{v}_x)$ $\partial f_d/\partial \dot{y} = (1/\lambda)(\hat{u}_y + \hat{v}_y)$ $\partial f_d/\partial \dot{z} = (1/\lambda)(\hat{u}_z + \hat{v}_z)$ The matrix H then is the Jacobian formed by the partial derivatives above (extended by zeros for acceleration components) for each of m illuminators:

$$H = \begin{bmatrix} \partial f_1/\partial x & \ldots & \partial f_1/\partial \dot{z} & 0 & 0 & 0 \\ \vdots & & \vdots & \vdots & \vdots & \vdots \\ \partial f_m/\partial x & \ldots & \partial f_m/\partial \dot{z} & 0 & 0 & 0 \end{bmatrix}$$

The linearize measurement equation is then given by:

$$\Delta f = H\Delta X + \upsilon$$

The measurement noise $\upsilon$ is assumed to be Gaussian and zero mean. The measurement noise covariance is:

$$R = \text{diag}(\sigma_d^2)$$

where it is understood that $\sigma_d$ has a different value for each measurement:

$$\sigma_d = \sqrt{3}/(\pi\tau\sqrt{SNR})$$

in which:

$\tau$=integration time

SNR=signal to noise ratio

The Kalman gain matrix is given by:

$$K = \tilde{P}_x H^T [H\tilde{P}_x H^T + R]^{-1}$$

The updated state vector is given by:

$$\Delta X = \Delta \tilde{X} + K[\Delta f - H\Delta \tilde{X}]$$

$$X = \tilde{X} + \Delta X$$

The updated covariance matrix is given by the 'stabilized' equation:

$$P_x = (I-KH)\tilde{P}_x(I-KH)^T + KRK^T$$

in which I is the identity matrix.

We set $\Delta \tilde{X} = 0$ and iteratively compute H, K, $\Delta f$, $\Delta X$, X, and $P_x$ until $\Delta X$ is sufficiently small, $\Delta f$ increases, or the maximum number of iterations has been completed.

From the SRIF, the launch parameters and covariance are estimated as follows:

$$L = [p, \phi, \lambda, \alpha]^T, P_L$$

where
- p=phase time ($t_1-t_0$)
- $\phi$=geodetic latitude
- $\lambda$=longitude
- $\alpha$=acceleration magnitude (local zenith direction)
- $P_L$=covariance of L The initial Kalman filter (KF) state vector X at the time of the missile launch is obtained from the WGS84 ellipsid model as follows. Define the w axis to be the intersection of the equatorial plane and the plane of the meridian corresponding to $\lambda$, with w positive in the direction of the launch point. The equation of the ellipse is:

$$w^2/a^2 + z^2/b^2 = 1$$

Let ($w_1, z_1$,) be the point on the ellipse corresponding to $\phi$. The slope of the normal at this point satisfies the equation:

$$\tan\phi = (a^2/b^2)(z_1/w_1)$$

Solving for $z_1$:

$$z_1 = (b^2/a^2) w_1 \tan\phi$$

Substituting this into the equation of the ellipse and solving for $w_1$:

$$w_1 = a^2/(a^2 + b^2 \tan^2\phi)^{1/2}$$

The altitude h of the launch point above the ellipsoid is assumed to be known approximately and is not estimated. The launch point ($w_2, z_2$) is related to ($w_1, z_1$) by:

$$(w_2, z_2) = (w_1, z_1) + h(\cos\phi \sin\phi)$$

Finally, the x, y coordinates are computed from w, $\lambda$ by:

$$x_2 = w_2 \cos\lambda$$

$$y_2 = w_2 \sin\lambda$$

The initial velocity is zero, and the initial acceleration is normal to the ellipsoid:

$$ax = \alpha\cos\phi\cos\lambda$$

$$ay = \alpha\cos\phi\sin\lambda$$

$$az = \alpha\sin\phi$$

The initial KF covariance matrix is obtained by linearizing the equations above. That is:

$$\Delta X = J \Delta L$$

where J is the Jacobian and:

$$P_X = E[\Delta X \Delta X^T]$$
$$= JE[\Delta L \Delta L^T] J^T$$
$$= J P_L J^T$$

The elements of the Jacobian J are obtained from the following sequence of partial derivatives:

$$\frac{\partial w_1}{\partial \phi} = \frac{-a^2 b^2 \sin\phi}{(a^2\cos^2\phi + b^2\sin^2\phi)^{3/2}}$$

$\partial z_1/\partial\phi = (b^2/a^2)[w_1 \sec^2\phi + (\partial w_1/\partial\phi)\tan\phi]$ $\partial w_2/\partial\phi = \partial w_1/\partial\phi - h \sin\phi)$ $\partial z_2/\partial\phi = \partial z_1/\partial\phi + h \cos\phi$ $\partial x_2/\partial\phi = (\partial w_2/\partial\phi)\cos\lambda$ $\partial x_2/\partial\lambda = -w_2 \sin\lambda$ $\partial y_2/\partial\phi = (\partial w_2/\partial\phi)\sin\lambda$ $\partial y_2/\partial\lambda = w_2 \cos\lambda$ All of the other partial derivatives of position components are zero and all partial derivatives of velocity components are zero. The partial derivatives of the acceleration components are:

$\partial ax/\partial p = 0$ $\partial ax/\partial\phi = -\alpha \sin\phi \cos\lambda$ $\partial ax/\partial\lambda = -\alpha \cos\phi \sin\lambda$ $\partial ax/\partial\alpha = \cos\phi \cos\lambda$ $\partial ay/\partial p = 0$ $\partial ay/\partial\phi = -\alpha \sin\phi \sin\lambda$ $\partial ay/\partial\lambda = \lambda \cos\phi \cos\lambda$ $\partial ay/\partial\alpha = \cos\phi \sin\lambda$ $\partial az/\partial p = 0$ $\partial az/\partial\phi = \alpha \cos\phi$ $\partial az/\partial\lambda = 0$ $\partial az/\partial\alpha = \sin\phi$ When the KF is invoked by the SRIF for the purpose of computing predicted measurement residuals, the rows and columns of $p_x$ corresponding to position components will be set to zero prior to each state and covariance update. That is, the SRIF estimate of initial position will be interpreted as truth. This technique is analogous to a profile based filter.

The function of the SRIF is to estimate the launch parameters and thereby initialize the state vector and covariance matrix for the KF. This technique is analogous to that used in space-based IR surveillance systems, except that we use a KF instead of target profiles. The key idea is to prevent the KF from performing measurement updates to the position data provided by the SRIF. This is accomplished by zeroing the rows and columns of the covariance matrix corresponding to position components. In this way, the KF dynamically constructs a "profile" from which we may compute measurement residuals. This technique is also analogous to that used for many years in orbit determination. Having computed measurement residuals and partial derivatives of measurements with respect to launch parameters, the launch parameters are corrected using a SRIF. The SRIF was selected for this calculation because it is reputed to be more numerically stable than the classical least squares technique. The SRIF estimates the launch parameters in REF with the REF coordinates being set in accordance with the missile azimuth as determined by the latest iteration through the KF. The launch parameters to be estimated are:

$$L=[p,\phi,\lambda,\alpha]^T$$

where:

p=phase time ($t_1-t_0$)
$\phi$=geodetic latitude
$\lambda$=longitude
$\alpha$=acceleration magnitude (local zenith direction)

It is assumed that initial estimates of the launch parameters are provided together with their standard deviations. From this we form a diagonal covariance matrix. This a priori data is denoted by:

$$\tilde{L}, \tilde{P}=\text{diag}(\sigma_i^2)$$

Using this estimate, the KF is invoked as described previously. The KF returns a set of measurement residuals denoted by:

$$\Delta f_i \text{ for } 1 \leq i \leq m$$

By perturbing each of the launch parameters individually and invoking the KF again, the Jacobian matrix of partial derivatives of the measurements with respect to the launch parameters is computed:

$$H = \begin{bmatrix} \partial f_1/\partial p & \partial f_1/\partial \phi & \partial f_1/\partial \lambda & \partial f_1/\partial \alpha \\ \vdots & \vdots & \vdots & \vdots \\ \partial f_m/\partial p & \partial f_m/\partial \phi & \partial f_m/\partial \lambda & \partial f_m/\partial \alpha \end{bmatrix}$$

A weighted least squares solution is sought. That is, each measurement is to be weighted by its standard deviation ad (see the KF measurement model). Thus, the matrix W is defined:

$$W=\text{diag}(1/\sigma_d)$$

where it is understood that $\sigma_d$ has a different value for each measurement. The weighted and linearized measurement equation is:

$$W\Delta f = WH\Delta L + \upsilon$$

where the random measurement noise $\upsilon$ has zero mean and unit covariance. The SRIF process can now begin. First, the a-priori data $\tilde{L}$ and $\tilde{P}_L$ must be converted to a "data equation". For this, we introduce the square root information matrix corresponding to $\tilde{P}_L$:

$$\tilde{P}_L = \tilde{R}^{-1}\tilde{R}^{-T} \text{ where } \tilde{R}=\text{diag}(1/\sigma_i)$$

The normalized initial launch parameter error vector $\upsilon$ is defined as follows:

$$\upsilon = \tilde{R}(\tilde{L}-L)$$

Note that $\upsilon$ has zero mean and unit covariance. The desired a priori data equation is:

$$0 = \tilde{R}(L-\tilde{L}) + \upsilon = \tilde{R}\Delta L + \upsilon$$

A least squares solution is sought to:

$$\begin{bmatrix} \tilde{R} \\ WH \end{bmatrix} \Delta L = \begin{bmatrix} 0 \\ W\Delta f \end{bmatrix} - \begin{bmatrix} \tilde{\upsilon} \\ \upsilon \end{bmatrix}$$

This is equivalent to finding the least squares solution to:

$$T \begin{bmatrix} \tilde{R} \\ WH \end{bmatrix} \Delta L = T \begin{bmatrix} 0 \\ W\Delta f \end{bmatrix} - T \begin{bmatrix} \tilde{\upsilon} \\ \upsilon \end{bmatrix}$$

where T is an orthogonal transformation. The transformation T may be chosen to be the Householder orthogonal transformation so that:

$$T \begin{bmatrix} \tilde{R} \\ WH \end{bmatrix} = \begin{bmatrix} \hat{R} \\ 0 \end{bmatrix}$$

where $\hat{R}$ is upper triangular. Define:

$$T \begin{bmatrix} 0 \\ W\Delta f \end{bmatrix} = \begin{bmatrix} \hat{f} \\ e \end{bmatrix}, T \begin{bmatrix} \tilde{\upsilon} \\ \upsilon \end{bmatrix} = \begin{bmatrix} \hat{\upsilon} \\ \upsilon_e \end{bmatrix}$$

The equivalent least squares problem is:

$$\hat{R}\Delta L = \hat{f} - \hat{\upsilon}$$

$$0 = e - \upsilon_e$$

The least squares solution is:

$$(\hat{\Delta L}) = \hat{R}^{-1}\hat{f}$$

The updated equation above may now be rewritten as:

The updated equation above may now be rewritten as:

$$(\hat{\Delta L}) = \Delta L + \hat{R}^{-1}\hat{\upsilon}$$

$$\hat{L} - \tilde{L} = L - \tilde{L} + \hat{R}^{-1}\hat{\upsilon}$$

$$\hat{L} = L + \hat{R}^{-1}\hat{\upsilon}$$

It may be shown that $\hat{\upsilon}$ has zero mean and unity covariance from which it follows that:

$$E[\hat{L}] = L$$

$$\hat{P}_L = E[(\hat{L}-L)(\hat{L}-L)^T]$$
$$= \hat{R}^{-1}E[\hat{\upsilon}\hat{\upsilon}^T]\hat{R}^{-T}$$
$$= \hat{R}^{-1}\hat{R}^{-T}$$

That is, we have a new estimate of the launch parameters:

$$\hat{L} = \tilde{L} + (\hat{\Delta L})$$
$$= \tilde{L} + \hat{R}^{-1}\hat{f}$$

and its associated covariance matrix is:

$$\hat{P}_L = \hat{R}^{-1}\hat{R}^{-T}$$

Note that $\hat{R}$ is easily inverted because it is upper triangular. This entire procedure is iterated until $\hat{\Delta L}$ is sufficiently small, $\Delta f$ increases, or the maximum number of iterations has been completed.

The above description is of a preferred embodiment of the invention and modification may be made thereto without departing from the spirit and scope of the invention as defined in the appended claims.

What is claimed is:

1. A method of estimating the launch point of a missile, comprising illuminating said missile with radar signals as said missile is launched from said launch point, receiving Doppler shifted signals reflected from said missile, estimating the velocity of said missile from the Doppler shifted signals reflected from said missile, establishing a rotated earth fixed coordinate system having an X-axis passing through an initial estimate of the launch point of said missile and having a Z-axis parallel to the azimuth of said missile as indicated by the estimated missile velocity and estimating launch point, in said rotated earth fixed coordinate system in response to the reflected Doppler shifted signals.

2. A method as recited in claim 1, further comprising establishing a second rotated earth fixed coordinate system in which an X-axis passes through the launch point estimated in said first mentioned rotated earth fixed coordinate system and a Z-axis is rotated at an angle less than 90 degrees from the azimuth of said missile and estimating the launch point in said second rotated earth fixed coordinate system in response to the reflected Doppler shifted signals.

3. A method as recited in claim 2, wherein the Z-axis of said second rotated earth fixed coordinate system is rotated to be at an angle of 45 degrees to the azimuth of said missile.

4. A method as recited in claim 1, wherein said estimated missile velocity is determined by a Kalman filter.

5. A method as recited in claim 4, wherein said Kalman filter estimates the velocity of said missile in earth centered fixed coordinates.

6. A method as recited in claim 4, wherein said launch point is estimated by a square root information filter.

7. A system for estimating the launch point of a missile comprising means to illuminate said missile with radar signals as it travels from its launch point, signal receiving means to receive Doppler shifted signals reflected from said missile, and estimating means to estimate the launch point of said missile from the reflected Doppler shifted signals received by said receiving means, said estimating means including a Kalman filter to estimate the azimuth of the velocity of said missile as it travels from its launch point in response to the Doppler shifted signals received by said signal receiving means, means to establish a rotated earth fixed (REF) coordinate system with an X-axis passing through an initial estimate of the missile launch point and with a Z-axes parallel to the missile velocity azimuth as estimated by said Kalman filter, and launch point error reducing means responsive to the Doppler shifted signals received by said signal receiving means to reduce the error component along said Z-axis in the launch point estimate to a minimum by differential correction.

8. A system as recited in claim 7, wherein said launch point error reducing means comprises a square root information filter.

9. A system as recited in claim 7, wherein said launch point estimation means includes means to establish a second rotated earth fixed (REF) coordinate system having an X-axis passing through the launch point estimated by said launch error reducing means and a Z-axis at an angle to the missile velocity azimuth estimated by said Kalman filter and second launch point estimating means responsive to the Doppler shifted signals received by said receiving means to reduce the component of the error in the launch point along the Z or Y-axis of said second REF coordinate system to a minimum by differential correction.

10. A system as recited in claim 9, wherein the angle between the missile velocity azimuth and the Z-axis of said second rotated earth fixed coordinate system is 45 degrees.

* * * * *

UNITED STATES PATENT AND TRADEMARK OFFICE
CERTIFICATE OF CORRECTION

PATENT NO.   : 6,498,580 B1
DATED        : December 24, 2002
INVENTOR(S)  : Bert L. Bradford It is certified that error appears in the above-identified patent and that said Letters Patent is hereby corrected as shown below:

<u>Title page,</u>
Item [*] Notice, please delete the following language:
"Subject to any disclaimer, the term of this patent is extended or adjusted under 35 U.S.C. 154(b) by 0 days." and insert the following language:
-- Subject to any disclaimer, the term of this patent is extended or adjusted under 35 U.S.C. 154(b) by 893 days. --

Signed and Sealed this

Eighteenth Day of November, 2003

JAMES E. ROGAN
*Director of the United States Patent and Trademark Office*